United States Patent [19]

Grabner et al.

[11] 3,948,562
[45] Apr. 6, 1976

[54] SUPPORT FOR A HEADREST PIVOTAL WITHIN CERTAIN LIMITS

[75] Inventors: Christian Grabner, Sindelfingen; Ludwig Weber, Boblingen; Kurt Niethammer, Unterjettingen, all of Germany

[73] Assignee: Daimler-Benz Aktiengesellschaft, Germany

[22] Filed: Aug. 12, 1974

[21] Appl. No.: 496,895

[30] Foreign Application Priority Data
Aug. 10, 1973 Germany............................ 2340530

[52] U.S. Cl. .............................................. 297/408
[51] Int. Cl.² ........................................... A47C 1/10
[58] Field of Search ........... 297/391, 403, 408, 409; 248/414

[56] References Cited
UNITED STATES PATENTS
3,547,486  12/1970  Herzer et al. ...................... 297/408
3,695,700  10/1972  Flach ................................ 297/408

Primary Examiner—James C. Mitchell
Attorney, Agent, or Firm—Craig & Antonelli

[57] ABSTRACT

A bearing support for a headrest in a motor vehicle which is pivotal within certain limits after overcoming a constantly effective friction force; a bearing socket which is rigidly connected with the lower area of the headrest member has an essentially triangularly shaped cross section and receives a bearing bolt that is being pressed by a wall subject to an elastic prestress against the remaining walls of the bearing socket.

22 Claims, 5 Drawing Figures

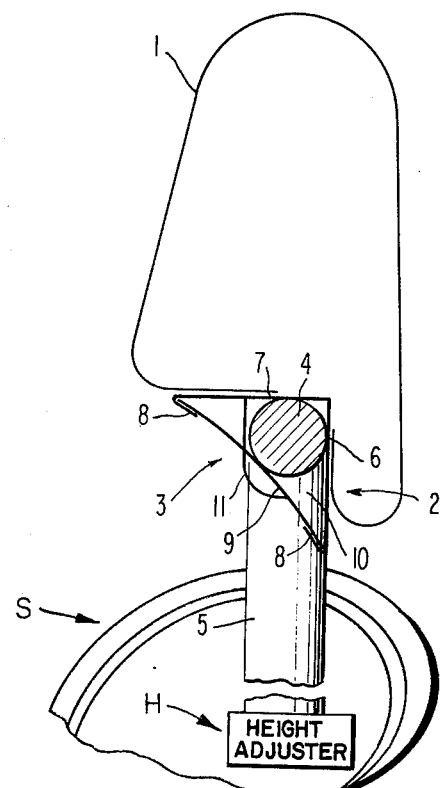
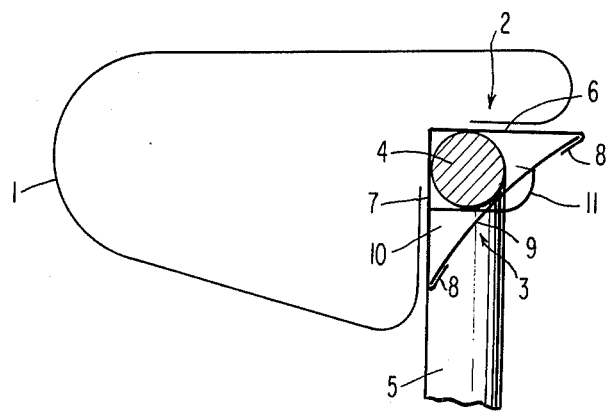

SUPPORT FOR A HEADREST PIVOTAL WITHIN CERTAIN LIMITS

The present invention relates to a bearing support for a preferably height-adjustable headrest in a vehicle, especially in a motor vehicle, which is pivotal within certain limits after overcoming a constantly effective friction force.

With such headrests, the constantly effective friction force is transmitted by contact or abutment members such as cones or brake jaws and the friction moment itself is produced by the feed movement of a threaded connection. This operation becomes frequently time-consuming since the adjusting members have to be arranged covered-off for the protection against injuries. Additionally, it frequently also happens after a longer use of the headrest that the originally adjusted friction force has been reduced to such an extent that the headrest will adjust itself without external assist. In that case, a repair shop has to be looked up in most cases because of the lack of suitable tools for the new adjustment of the headrest.

It is the aim of the present invention to simplify the pivot mechanism of a headrest by a corresponding construction of its bearing support in such a manner that an expensive and time-consuming adjustment of the friction force can be dispensed with. Additionally, a noticeable reduction of the original friction force is to be prevented even after a long use of the headrest.

Accordingly, a bearing support for a headrest in a vehicle, especially in a motor vehicle, preferably for a headrest adjustable in height, which is pivotal within certain limits after overcoming a constantly effective friction force, is proposed, whereby according to the present invention at least one bearing socket rigidly connected with the lower area of the headrest body is provided, which has an essentially triangularly shaped cross section and receives a preferably cylindrical bearing bolt which can be pressed by a wall of the bearing socket that is under an elastic prestress, against the remaining walls thereof.

A construction which is simple from a manufacturing point of view will result if the two walls that are not subjected to prestress, extend over a part or over the entire width of the headrest body.

In one preferred embodiment of the present invention, the bearing bolt is connected with at least one headrest support rod by an angularly bent portion whereby at least the angularly bent portion can be brought into abutment in the course of the pivot operation against the walls of the bearing socket which are not under prestress. An effective fixing of the end positions is possible thereby in a simple manner.

According to a further feature of the present invention, abutments or stops project from one of the walls which are not under prestress, which prevent an excessive movement or migration of the bearing bolt within the bearing socket.

Appropriately, the abutments have such a rigidity in the impact direction that in case of a head impact, the prestress force of the bearing socket wall changes only insignificantly.

Accordingly, it is an object of the present invention to provide a bearing support for pivotal headrests of the aforementioned type which avoids by simple means the shortcomings and drawbacks encountered in the prior art.

Another object of the present invention resides in a bearing support of a headrest pivotal within certain limits which avoids the need for timeconsuming adjusting operations and also precludes a significant reduction in the originally adjusted friction force, even after long use of the headrest.

A further object of the present invention resides in a headrest support of the type described above which is simple in construction and in manufacture, yet permits an effective determination of the end positions of the headrest by simple means.

Still another object of the present invention resides in a headrest support which prevents an excessive movement of the bearing bolt within the bearing socket.

Another object of the present invention resides in a bearing support for a headrest in which the prestress force of the bearing socket wall changes only insignificantly in case of an impact by the head of a vehicle passenger.

These and other objects, features and advantages of the present invention will become more apparent from the following description when taken in connection with the accompanying drawing which shows, for purposes of illustration only, several embodiments in accordance with the present invention, and wherein.

Figure 1:
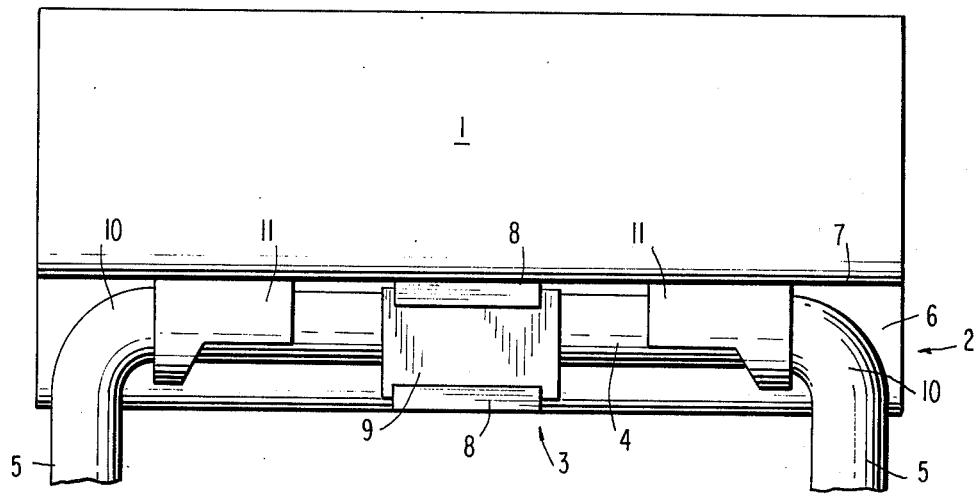
FIG. 1 is a somewhat schematic elevational view of a single bearing support of an approximately U-shaped bent headrest support rod in accordance with the present invention.
Figure 2:
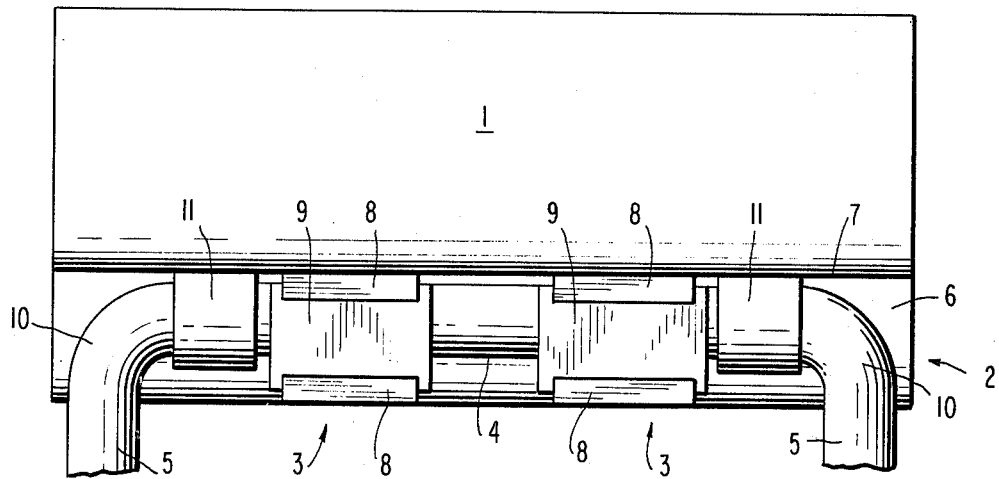
FIG. 2 is a somewhat schematic elevational view of a double bearing support of an approximately U-shaped bent headrest support rod in accordance with the present invention.
Figure 3:
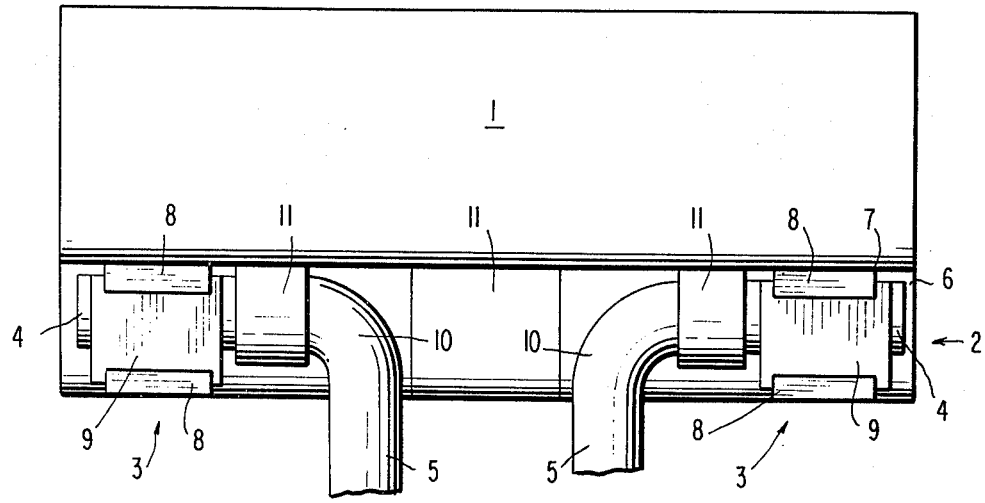

FIG. 3 is a somewhat schematic elevational view of a still further modified embodiment of a headrest support in accordance with the present invention, illustrating the bearing support possibility of the angularly bent ends of two headrest support rods extending adjacent one another; and FIGS. 4 and 5 are right side elevational views, partly in cross section, of the headrest supports of FIGS. 1 to 3, in the upright and folded-off position of the headrest, respectively.

Referring now to the drawing wherein like reference numerals are used throughout the various views to designate like parts, the headrest support body 1 of a headrest which is illustrated without padding, includes within its lower area generally designated by reference numeral 2, at least one bearing socket generally designated by reference numeral 3, in which is embedded a bearing bolt 4 of an associated headrest support rod 5. Each bearing socket 3 has an essentially triangular cross section—as can be seen from FIGS. 4 and 5—whereby two rigid walls 6 and 7, which preferably extend over the entire width of the headrest body 1, are provided within the area of the bearing socket 3 with a bent-off edge portion 8 for the support of a wall 9 which is subjected to an elastic or springy prestress. This wall 9 may consist of a flat spring steel of conventional type, by means of which the bearing bolt 4 is pressed with the predetermined stress against the two walls 6 and 7.

If this constantly effective friction force is overcome by an external force influence, then the headrest and together with the same the headrest support body 1 may be pivoted within the range of the two end positions illustrated in FIGS. 4 and 5. The securing of the end positions is achieved in that an angularly bent portion 10 which connects the bearing bolt 4 with the headrest support rod 5, abuts alternately at one of the walls 6 and 7.

Abutments or stops 11 which project from the wall 7 and are preferably bent off in the direction toward the wall 6, whose arrangement may be different depending on the position of the bearing sockets 3 and of the bearing bolts 4—as can be seen from FIGS. 1 to 3—prevent an excessive lateral movement or migration of the headrest body 1. In an advantageous manner, the abutments 11 are so constructed that as a result of their support action, the elastic or springy prestress of the wall 9 is not reduced to such an extent in case of a head impact that an automatic change of the headrest adjustment can take place.

As shown in FIG. 4, a conventional height adjusting arrangement generally designated by the reference character H can be provided in a seat generally designated by the reference character S to permit selective height adjustment of the head rest support body 1 and the headrest.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A bearing arrangement for a headrest means, the arrangement comprising: support means for supporting the headrest means so as to be pivotal between predetermined positions, said support means including a bearing bolt means, at least one bearing socket means for mounting the headrest means to the support means, said bearing socket means being securely connected with a lower area of the headrest means, said bearing socket means including a plurality of spaced walls which are arranged to form a socket having a triangular cross section, said bearing bolt means being received in said socket, at least one of said walls being formed by an elastic member engaging said bearing bolt means and pressing said bearing bolt means with a predetermined prestress against the remaining walls of the bearing socket means.

2. A bearing arrangement according to claim 1, wherein means are provided for adjusting the height of the headrest means.

3. A bearing arrangement according to claim 1, wherein said bearing bolt means is cylindrical.

4. A bearing arrangement according to claim 1, wherein the remaining walls extend over at least a portion of the headrest means.

5. A bearing arrangement according to claim 4, wherein the remaining walls extend over the entire width of the headrest means.

6. A bearing arrangement according to claim 4, wherein said remaining walls extend only over a portion of the width of the headrest means.

7. A bearing arrangement according to claim 1, wherein said support means further includes at least one support rod, and at least one angularly bent member for connecting said support rod with said bearing bolt means, said angularly bent member being brought into abutment in the course of the pivotal movement of the headrest means against the remaining walls of the bearing socket means.

8. A bearing arrangement according to claim 7, wherein abutment means are provided for preventing excessive lateral movement of the bearing bolt means within the bearing socket means, said abutment means projecting from one of the remaining walls.

9. A bearing arrangement according to claim 8, wherein said abutment means are rigid at least in the impact direction whereby upon a head impact against the headrest means an automatic change of the headrest means position cannot take place.

10. A bearing arrangement according to claim 9, wherein the remaining walls extend over at least a portion of the headrest means.

11. A bearing arrangement according to claim 10, wherein the remaining walls extend over the entire width of the headrest means.

12. A bearing arrangement according to claim 10, wherein said remaining walls extend only over a portion of the width of the headrest means.

13. A bearing arrangement according to claim 10, wherein means are provided for adjusting the height of the headrest means.

14. A bearing arrangement according to claim 13, wherein said bearing bolt means is cylindrical.

15. A bearing arrangement according to claim 1, wherein abutment means are provided for preventing excessive lateral movement of the bearing bolt means within the bearing socket means, said abutment means projecting from one of the remaining walls.

16. A bearing arrangement according to claim 15, wherein said abutment means are rigid at least in the impact direction whereby upon a head impact against the headrest means an automatic change of the headrest means position cannot take place.

17. A bearing arrangement according to claim 1, wherein at least two bearing socket means are provided, each of said bearing socket means including a plurality of spaced walls arranged to form a socket having a triangular cross section, at least one wall of each of said bearing socket means being formed by an elastic member engaging said bearing bolt means and pressing said bearing bolt means against the respective remaining walls of the bearing socket means.

18. A bearing arrangement according to claim 1, wherein said headrest means includes side edges, one of said bearing socket means being connected to the lower area of said headrest means at each side edge thereof.

19. A bearing arrangement according to claim 18, wherein two bearing bolt means are provided, and wherein said support means further includes at least two support rods and two angularly bent members for connecting said support rods with a respective bearing bolt means, said support rods being disposed between the side edges of the headrest means with the angular bent members projecting toward said side edges.

20. A bearing arrangement according to claim 19, wherein abutment means are provided for preventing excessive lateral movement of the bearing bolt means within the bearing socket means, said abutment means being provided on at least one of the remaining walls of each of said bearing socket means.

21. A bearing arrangement according to claim 17, wherein said support means further includes at least two support rods and two angularly bent members for connecting said support rods with said bearing bolt means, said bearing socket means being securely connected with the lower area of the headrest means at positions between the angularly bent members.

22. A bearing arrangement according to claim 21, wherein abutment means are provided for preventing excessive lateral movement of the bearing bolt means within the bearing socket means, said abutment means being provided on at least one of the remaining walls of each of said bearing socket means.

* * * * *